(12) United States Patent
Prause et al.

(10) Patent No.: US 12,235,094 B2
(45) Date of Patent: Feb. 25, 2025

(54) CONFOCAL MEASURING APPARATUS FOR 3D MEASUREMENT OF AN OBJECT SURFACE

(71) Applicant: Hochschule für angewandte Wissenschaften Kempten Körperschaft des öffentlichen Rechts, Kempten (DE)

(72) Inventors: Korbinian Prause, Buchenberg (DE); Michael Layh, Altusried (DE)

(73) Assignee: Hochschule für angewandte Wissenschaften Kempten Körperschaft des öffentlichen Rechts, Kempten (DE)

(*) Notice: Subject to any disclaimer, the term of this patent is extended or adjusted under 35 U.S.C. 154(b) by 169 days.

(21) Appl. No.: 17/784,047

(22) PCT Filed: Dec. 30, 2020

(86) PCT No.: PCT/EP2020/088020
§ 371 (c)(1),
(2) Date: Jun. 9, 2022

(87) PCT Pub. No.: WO2021/140052
PCT Pub. Date: Jul. 15, 2021

(65) Prior Publication Data
US 2023/0003514 A1    Jan. 5, 2023

(30) Foreign Application Priority Data
Jan. 9, 2020 (DE) .................... 10 2020 200 214.2

(51) Int. Cl.
*G01B 11/24* (2006.01)
(52) U.S. Cl.
CPC .................. *G01B 11/24* (2013.01)

(58) Field of Classification Search
CPC ........................... G01B 11/24; G01B 2210/50
See application file for complete search history.

(56) References Cited

U.S. PATENT DOCUMENTS

| | | |
|---|---|---|
| 6,133,986 A | 10/2000 | Johnson |
| 9,188,874 B1 | 11/2015 | Johnson |
| (Continued) | | |

FOREIGN PATENT DOCUMENTS

| | | | |
|---|---|---|---|
| DE | 20010830 U1 * | 12/2000 | ............. G01B 11/30 |
| DE | 69729659 | 6/2005 | |
| (Continued) | | | |

OTHER PUBLICATIONS

Kim, 2013, Chromatic confocal microscopy with a novel wavelength detection method using transmittance, optics express, vol. 21, No. 5 (Year: 2013).*

(Continued)

*Primary Examiner* — Uzma Alam
*Assistant Examiner* — Justin J Van Cleave
(74) *Attorney, Agent, or Firm* — Smartpat PLC

(57) ABSTRACT

A confocal measuring apparatus serves for 3D measurement of an object surface. The measuring apparatus has a light source for measuring light, a lens array having a plurality of array lenses, a chromatic telescope, multiplexer optics, collimation optics and spatially resolved detection device. The chromatic telescope images an object plane into an arrangement plane of the lens array. The multiplexer optics is arranged at a distance of a total of a focal length of the array lenses on the one hand and a focal length of the multiplexer optics, downstream of the lens array. A single pinhole aperture is arranged at a distance of the focal length of the multiplexer optics. The collimation optics is arranged downstream of the pinhole aperture. A confocal measuring appa- (Continued)

ratus results, which has a simplified design and at the same time a high measurement throughput.

12 Claims, 3 Drawing Sheets

(56) References Cited

U.S. PATENT DOCUMENTS

| | | | |
|---|---|---|---|
| 10,228,551 B1* | 3/2019 | Dietz | G01B 11/24 |
| 2006/0087660 A1 | 4/2006 | Zabolitzky et al. | |
| 2008/0266655 A1* | 10/2008 | Levoy | G02B 27/0075 |
| | | | 359/368 |
| 2009/0021750 A1 | 1/2009 | Korner et al. | |
| 2010/0099984 A1 | 4/2010 | Graser | |
| 2011/0228250 A1 | 9/2011 | Xie et al. | |
| 2014/0192406 A1 | 7/2014 | Bathe | |
| 2015/0055215 A1* | 2/2015 | Chen | G02B 21/0032 |
| | | | 359/385 |
| 2015/0090908 A1 | 4/2015 | Lippert et al. | |
| 2016/0091799 A1 | 3/2016 | Rachet et al. | |
| 2020/0033121 A1* | 1/2020 | Wouters | G01B 11/24 |

FOREIGN PATENT DOCUMENTS

| | | |
|---|---|---|
| DE | 102005043627 A1 | 3/2007 |
| DE | 102007019267 A1 | 10/2008 |
| DE | 102006007170 | 6/2009 |
| DE | 102013016368 A1 | 4/2015 |
| DE | 102015115615 A1 | 3/2017 |
| EP | 2369294 B1 | 7/2014 |
| KR | 101368486 B1 | 3/2014 |
| WO | 03098148 A1 | 11/2003 |
| WO | 2010084478 A2 | 7/2010 |
| WO | 2012110924 A1 | 8/2012 |
| WO | 2013020663 A1 | 2/2013 |
| WO | 2014180642 A1 | 11/2014 |
| WO | 2016193037 A1 | 12/2016 |

OTHER PUBLICATIONS

Machine Translation of DE 20010830 U1 (Year: 2000).*
Hillenbrand, 2012, Chromatic information coding in optical systems for hyperspectral imaging and chromatic confocal sensing, Optical Systems Design (Year: 2012).*
Gissibl et al., Nature Photonics, (20160000), vol. 10, pp. 554-561.
Optolines, Systeme für die optische Messtechnik, Hyperchromate, (20100000), No. 23, pp. 14-17.
Taejoong Kim et al., Chromatic confocal microscopy with a novel wavelength detection method using transmittance, Optics Express, Mar. 11, 2013, Optical Society of America, US, vol. 21, Nr: 5, pp. 6286.
Timo Gissibl et al., Sub-micrometre accurate free-form optics by three-dimensional printing on single-mode fibres, Nature Communications, vol. 7, p. 11763, Jun. 24, 2016.
Zint et al., Journal of Medical Imaging, (20190000), vol. 6, No. 3, p. 033502.
European Patent Office, Office Action in related application EP 20 839 124.3, dated Apr. 25, 2024.

* cited by examiner

CONFOCAL MEASURING APPARATUS FOR 3D MEASUREMENT OF AN OBJECT SURFACE

CROSS-REFERENCES TO RELATED APPLICATIONS

This application claims the priority of German Patent Application, Serial No. DE 10 2020 200 214.2, filed Jan. 9, 2020, the content of which is incorporated herein by reference in its entirety as if fully set forth herein.

FIELD OF THE INVENTION

The invention relates to a confocal measuring apparatus for 3D measurement of an object surface.

BACKGROUND OF THE INVENTION

Confocal measuring apparatuses for object measurement are known from WO 2014/180 642 A1, DE 10 2005 043 627 A1, DE 10 2006 007 170 A1, DE 10 2007 019 267 A1, WO 2016/193 037 A1, the technical article by Zint et al, Journal of Medical Imaging 6(3), 033502, 2019, the technical article by Kim et al, Optics Express, Vol. 21, No. 5, 6286 to 6294, 2013 and KR 10 1 368 486 A. DE 10 2013 016 368 A1 discloses a light microscope and a microscopy method for examining a microscopic specimen. DE 697 29 659 T2 discloses a microlens scanner for microlithography and for wide-field confocal microscopy. WO 2010/084478 A2 discloses equipment for high-resolution microscopy and photolithography using micromirrors. U.S. Pat. No. 9,188,874 B1 discloses an imaging system using a spot array for maskless lithography and parallel confocal microscopy.

SUMMARY OF THE INVENTION

It is an object of the present invention to further design a confocal measuring apparatus of the type mentioned above in such a way that its structure is simplified while at the same time achieving a high measurement throughput.

This object is achieved according to the invention by a confocal measuring apparatus for 3D measurement of an object surface,
  having a light source for measuring light,
  having a lens array having a plurality of array lenses,
  having a chromatic telescope imaging an object plane into an arrangement plane of the lens array,
  having a multiplexer optics arranged at a distance of a total of a focal length of the array lenses on the one hand and a focal length of the multiplexer optics, downstream of the lens array in the beam path of the measuring light which emanates from the object plane,
  having a single pinhole aperture, which is arranged at a distance of the focal length of the multiplexer optics, downstream of the multiplexer optics in the beam path of the measuring light, which emanates from the object plane;
  having a collimation optics which is arranged downstream of the pinhole aperture in the beam path of the measuring light emanating from the object plane,
  having a spatially resolved detection device which is arranged downstream of the collimation optics in the beam path of the measuring light emanating from the object plane.

The multiplexer optics according to the invention avoids the need for an aperture array that is complex to adjust. At the same time, a high spatial resolution and a parallel multi-channel measurement via the lens array and the spatially resolved detection device are possible. The single pinhole aperture serves as a multiplexer for spatial filtering of the beam paths of all individual channels of the measuring light beam path assigned to the respective array lenses, which emanates from the object surface. An array filtering via an aperture array, which would require complex adjustment, is not necessary. The multiplexer optics can be designed as a single multiplexer lens. The collimation optics may be designed as a single collimation lens. The measuring light from the light source may be coupled, in particular via a polarizing beam splitter, into a beam path of the measuring light between the chromatic telescope and the spatially resolved detection device. Part of a coupling optics can be a λ/4-plate. The latter can be arranged between the coupling in, polarizing beam splitter and the lens array.

A telecentric beam path in the chromatic telescope configured such that a beam path of the measuring light in the chromatic telescope is telecentric reduces the requirements for a positioning of an aperture of the chromatic telescope. Scale errors in the 3D measurement of the object surface can be avoided.

A detection array configured such that the detection device comprises at least one detection array with detector pixels enables multi-channel measurement. The detection array may be embodied as a CCD array or a CMOS array.

The design of the detection device configured such that the detection device comprises a beam splitter and two mutually independent detection arrays, each of which is arranged downstream of the beam splitter in a partial beam path of the measuring light increases the degrees of freedom of the data acquisition as well as the data evaluation. The partial beam paths of the measuring light may each be guided via a telescope for imaging a detection entrance plane onto the respective detection array. This imaging can be telecentric.

A color gradient filter comprising at least one color gradient filter in one of the two partial beam paths of the detection device enables a data evaluation which is described for a single-channel measurement in the technical article by Kim et al. "Chromatic confocal microscopy with a novel wavelength detection method using transmittance," Optics Express, Vol. 21, No. 5, pages 6286 to 6294, 2013 or in KR 10-1368486 A. This evaluation technique can be applied to the pixel-wise channels of the detection device with the detection arrays so that the individual channels can be evaluated in parallel.

An adaptation of the raster spacing configured such that a raster spacing of the array lenses of the lens array is adapted to a raster spacing of the detector pixels of the at least one detection array optimizes a spatial resolution of the confocal measuring apparatus. The adaptation of the raster spacing can be selected such that exactly one detector pixel is assigned to each array lens. Alternatively, the raster spacing adaptation can also be done in such a way that exactly one array lens is assigned a plurality of detector pixels.

A bandpass filter comprising a spectral bandpass filter for limiting a spectral range of the measuring light can be used to limit the spectral range of the measuring light to a spectral range for which the chromatic telescope is designed. A correspondingly selected spectral range may, for example, be in the range between 400 and 600 nm, in particular between 400 and 500 nm. Instead of a bandpass filter, a combination of a spectral highpass filter and a spectral lowpass filter may also be used.

An embodiment of the invention is explained in more detail below with reference to the drawing.

DESCRIPTION OF THE PREFERRED EMBODIMENTS

A confocal measuring apparatus 1 serves for 3D measurement of a surface 2 of an object 3.

Figure 1:
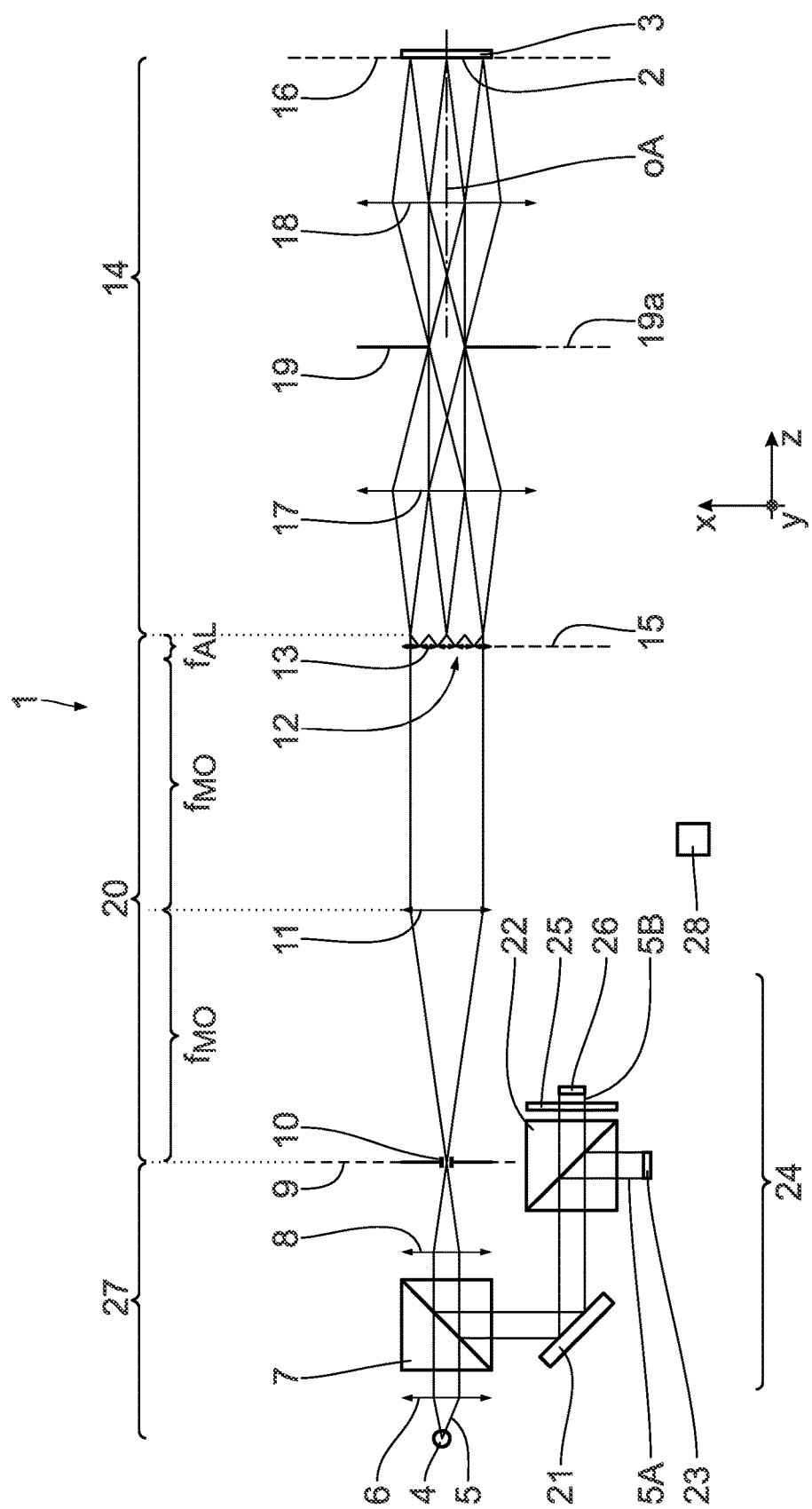
FIG. 1 schematically shows a confocal measuring apparatus for 3D measurement of an object surface.

A light source 4 of the measuring apparatus 1 generates measuring light 5. Exemplary individual beams of the measuring light 5 are shown in FIG. 1 to illustrate a beam path through the measuring apparatus 1. The light source 4 is designed as a point light source and can be formed by an exit end of an optical fiber. The measuring light 5 is broadband and can be, for example, white light with wavelengths in the range between 400 nm and 750 nm. Other wavelength band ranges in the UV, VIS, NIR and/or in the IR range are also possible depending on the light source or depending on the subsequent processing of the measuring light 5.

In order to facilitate positional relationships, a Cartesian xyz coordinate system is used below. The x-axis in FIG. 1 runs upward and perpendicular to the path of a main beam of measuring light between the light source 4 and the object 3. The y-axis is perpendicular to the drawing plane of FIG. 1 toward the viewer. The z-axis runs to the right in FIG. 1 parallel to the direction of the main beam between the light source 4 and the object 3.

The measuring light 5 is first collimated via a collimation lens 6, which like other lenses in the beam path of the measuring apparatus 1 is indicated by a double arrow in FIG. 1, and passes through a non-polarizing beam splitter 7. The measuring light 5 is then focused via a focusing lens 8, resulting in a focus in a focal plane 9. At the location of the focus, a pinhole aperture 10 is arranged in the focal plane 9, which can have the function of a spatial filter.

After passing through the pinhole 10, the measuring light 5 is collimated by a further collimation lens 11. The collimated measuring light 5 passes through a lens array 12 with a plurality of array lenses 13, which are arranged in rows and columns in the xy plane and of which five array lenses 13 are shown schematically in FIG. 1.

The array lenses 13 are designed as cushion lenses with a single lens size (xy extension) of 350 μm×350 μm. The array lenses 13 are densely packed in the xy plane. A distance between adjacent array lenses 13 is therefore also 350 μm. The array lenses 13 each have a focal length of 1.59 mm. One "pixel" of the lens array thus has a typical extension of 350 μm. Alternatively, such a pixel may have another extension in the range between 10 μm and 1,000 μm, for example in the range between 50 μm and 500 μm. The entire lens array 12 has an extension of 10 mm×10 mm in the xy plane. Thus, a total of about 900 array lenses 13 are present. The number of array lenses 13 can also be significantly larger in alternative designs of the lens array 12 and can have, for example, up to 1,000, up to 5,000, up to 10,000, up to 100,000 or even up to 1,000,000 array lenses 13.

The lens array 12 may be produced using techniques disclosed in the technical articles by Gissibl et al, Nature Photonics, Vol. 10, pages 554 to 561, 2016, and Nature Communications, 7:11763, DOI: 10.1038/necomms11763.

A hyperchromatic objective 14, as an example of a chromatic telescope, located downstream in the beam path of the measuring light 5 in the lens array 12 images an arrangement plane 15 of the array lenses 13 of the lens array 12 into an object plane 16 in which the surface 2 of the object 3 is disposed.

Components of the chromatic telescope 14 are two telescope lenses 17, 18 with an intermediate telecentric aperture 19. The latter is arranged in a pupil plane 19a of the chromatic telescope 14.

A focal length of the hyperchromatic objective 14 strongly depends on the wavelength of the measuring light 5. For the prior art of corresponding hyperchromatic objectives and hyperchromats, reference is made to a technical article from the journal Optolines, No. 23, pages 14 to 17, 2010.

The measuring light reflected from the surface 2 again passes through the hyperchromatic objective 14 and the lens array 12 and then through the collimation lens 11, which then acts as a focusing lens. A selection of transmitted portions of the measuring light 5 then takes place via the pinhole aperture 10, depending on the structure height of the object 3 on the surface 2 and the respective wavelength of the measuring light 5.

The lens array 12, the pinhole aperture 10, and the intermediate lens 11 are components of a pinhole aperture multiplexer 20. The lens 11 of this pinhole aperture multiplexer 20 is a multiplexer optics. This multiplexer optics 11 is arranged at a distance of a total of a focal length $f_{AL}$ of the array lenses 13 and a focal length $f_{MO}$ of the multiplexer optics 11 itself. This total-distance relationship does not have to be kept exactly, but a deviation, for example, in the range of 20% between the distance of the multiplexer optics 11 and the lens array 12 on the one hand and the total of the focal lengths $f_{AL}$ and $f_{MO}$ on the other hand is permissible. In the beam path of the measuring light 5, which emanates from the surface 2 of the object 3, i.e. from the object plane 16, the multiplexer optics 11 is arranged downstream from the lens array 12.

A beam path within the chromatic telescope 14 is telecentric. Main beams emanating from object points on the surface 2 of the object 3 thus run parallel to one another between the object plane 16 and the lens 18. The same applies to the course of the main beams between the telescope lens 17 and the lens array 12.

The pinhole aperture 10 is again arranged at a distance of the focal length $f_{MO}$ of the multiplexer optics 11 downstream therefrom.

The lens 8 between the beam splitter 7 and the pinhole aperture 10 represents a collimation optics, which is arranged downstream of the pinhole aperture 10 in the beam path of the measuring light 5 emanating from the object plane 16.

The pinhole aperture 10 serves as a multiplexer for spatial filtering of the beam paths of all individual channels of the measuring light beam path assigned to the respective array lenses 13. There is no need for spatial filtering in the form of a pinhole aperture array, which would require complex adjustment.

Measuring light 5 reflected by beam splitter 7, which in turn has been transmitted by the pinhole aperture 10, is guided via a folding mirror 21 and a further non-polarizing beam splitter 22 and divided by this beam splitter 22 into two measuring light partial beams 5A and 5B. Depending on the design of the beam path in the measuring apparatus 1, the folding mirror 21 can also be dispensed with. The measuring light partial beam 5A reflected by the beam splitter 22 impinges on a first detector array 23 of a spatially resolved detection device 24. The measuring light partial beam 5B transmitted by the beam splitter 22 first passes through a linear color filter 25 and then impinges on a further detector array 26 of the detection device 24.

The detection device 24 is arranged downstream of the collimation optics, i.e. the lens 8, in the beam path of the measuring light 5 emanating from the object plane 16.

The light source 4, the lenses 6 and 8, and the intermediate beam splitter 7 are components of an illumination device 27 of the measuring apparatus 1.

The pixel resolution of the detector pixels of the detector arrays 23 and 26 is adapted to the array arrangement of the array lenses 13 of the lens array such that one array lens 13 is assigned to one detector pixel each. A raster spacing of the array lenses 13 of the lens array 12 is thus adapted to a raster spacing of the detector pixels of the detector arrays 23 and 26.

A central control device 28, which is in signal communication with the detector arrays 23, 26 and with the light source 4 in a manner not shown, is also part of the measuring apparatus 1.

Figure 2:
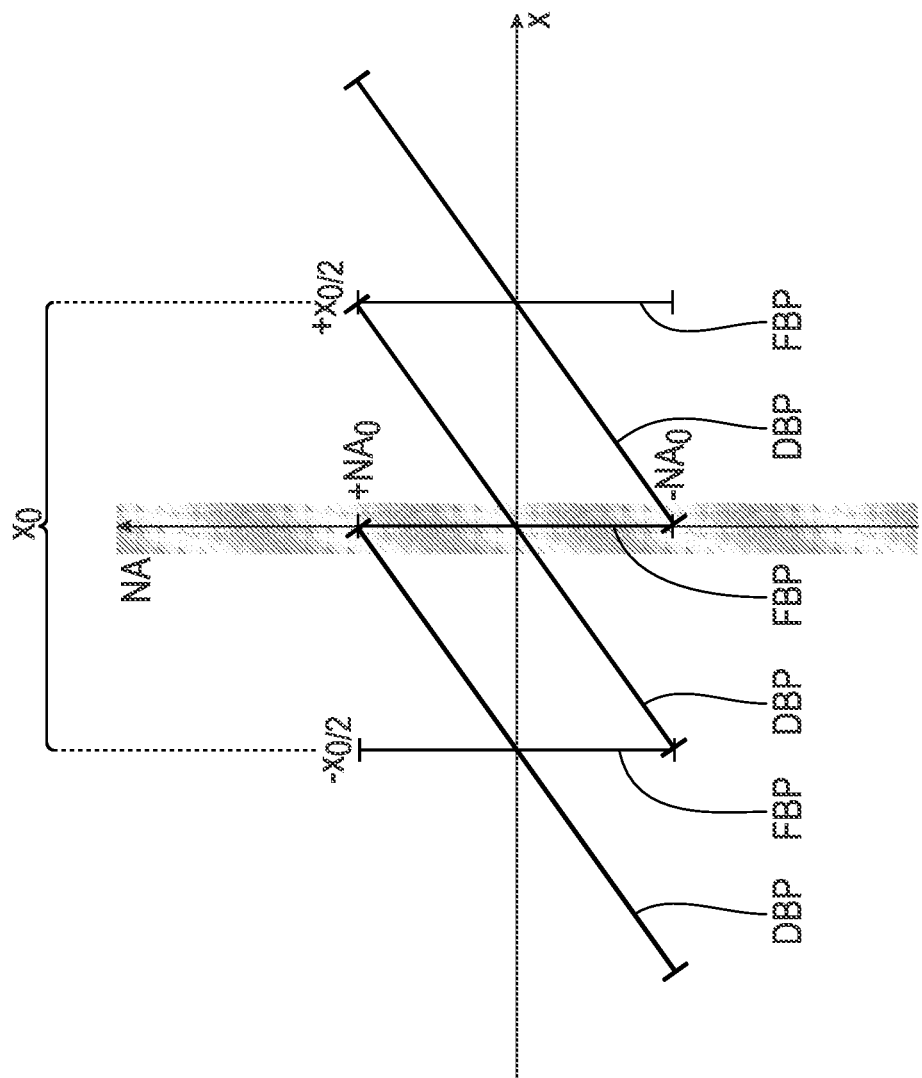
FIG. 2 shows a light field diagram in which an illumination angle (NA) of measuring light emanating from a measuring point on the object surface is shown as a function of a distance x of a measuring point from an optical axis of the measuring apparatus to illustrate the effect of raster illumination of the object to be measured.

FIG. 2 abstractly shows the spatial resolution effect of the pinhole aperture multiplexer 20 with the lens array 12 and the pinhole aperture 10. A measuring light field is shown as a two-dimensional function. In the dimension x, i.e. on the x-axis, a distance of the respective measuring or object point of the object 3, from which the measuring light 5 emanates, to a central optical axis oA (cf. FIG. 1) of the measuring light beam path is shown. On the diagram axis "NA" of FIG. 2, which is perpendicular to this axis, an illumination or beam angle of a respective measuring light beam, which emanates from the object point, is shown.

Perpendicular to the x-axis, i.e. spatially localized, the light fields of focused illumination points FBP are shown at the location of object points which correspond to the respective positions of the array lenses 13 of the lens array 12. Due to the focusing of the focused illumination points FBP, they each have only one x-coordinate but one beam angle bandwidth, so that the focused illumination points FBP sweep a bandwidth between the values $-NA_0$ and $+NA_0$ in the angular dimension NA.

In addition, FIG. 2 shows defocused illumination points DBP, which appear as a shear, i.e., oblique lines, in the x/NA light field illustration according to FIG. 2. In the x dimension, each defocused illumination point DBP runs over a total distance of $x_0$, for example from $-x_{0/2}$ to $+x_{0/2}$.

The selection of the spacing between the array lenses 13 of the lens array 12 ensures that the defocused illumination points DBP do not overlap in the x dimension, so that no crosstalk occurs between the individual channels of the beam path of the lens array 12. It is thus possible during the spatially resolved measurement with the detection device 24 to assign the respective measured light signal to exactly one object point according to the spatial resolution of the lens array 12.

An evaluation of color-dependent intensity ratios of the measurement results of the two detection arrays 23 and 26 can be performed for structure determination of the surface 2 as known, for example, from the technical article by Kim et al. "Chromatic confocal microscopy with a novel wavelength detection method using transmittance," Optics Express, Vol. 21, No. 5, pages 6286 to 6294, 2013 or from KR 10-1368486 A. The single-channel evaluation described therein can be performed separately for each pixel of the detection arrays 23, 26 of the detection device 24, so that the spatially resolved measurement result of the structure measurement of the surface 2 can be determined in parallel.

Figure 3:
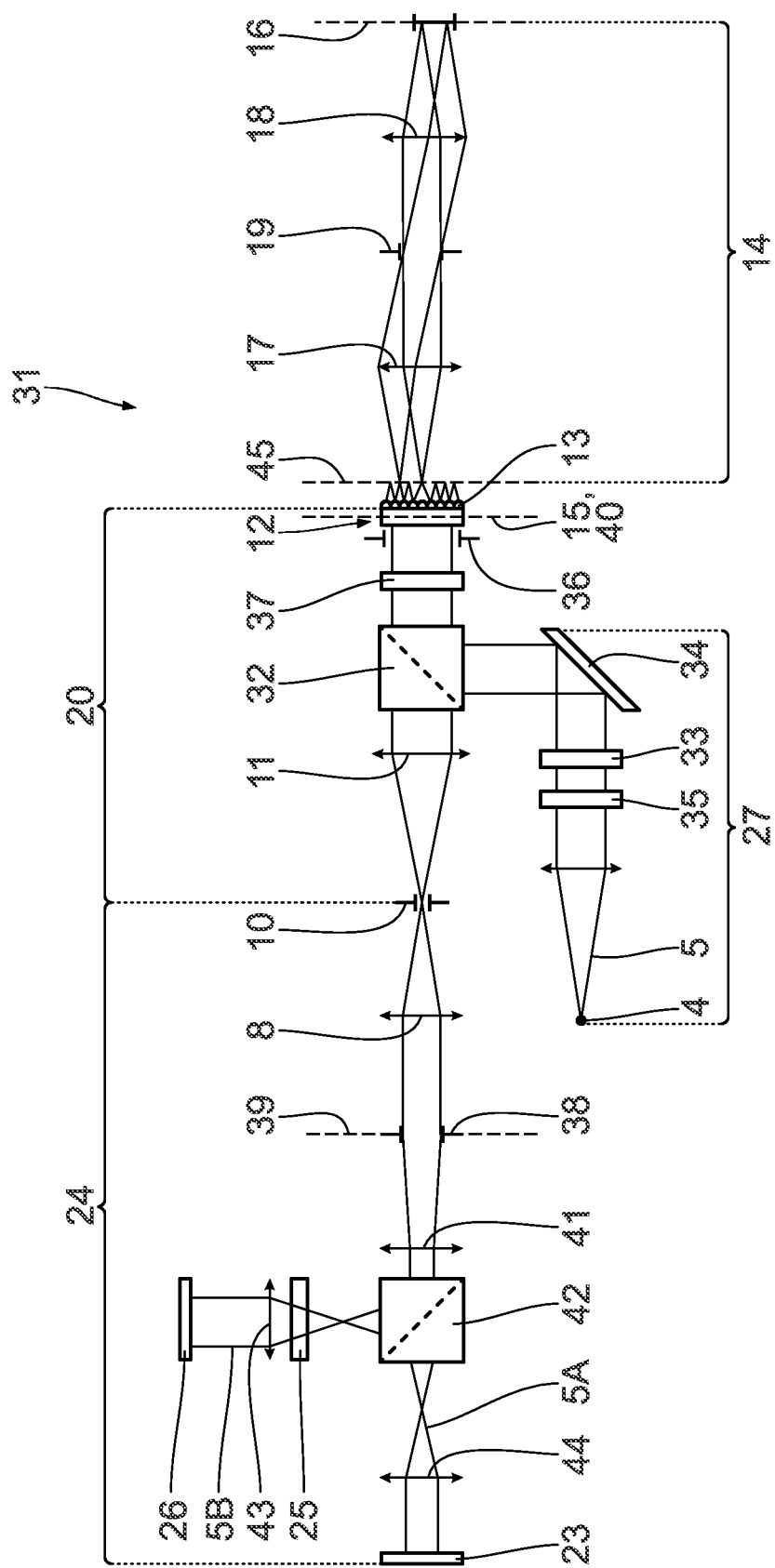
FIG. 3 in an illustration similar to FIG. 1, shows a further embodiment of a confocal measuring apparatus for 3D measurement of an object surface.

With reference to FIG. 3, a further embodiment of a confocal measuring apparatus 31 is described below, which can be used instead of the measuring apparatus 1 for 3D measurement of an object surface.

Components and functions as well as measuring methods which have already been explained above in connection with the confocal measuring apparatus 1 and in particular with FIGS. 1 and 2 bear the same reference numerals and will not be discussed in detail again.

In the measuring apparatus 31, the measuring light 5 is coupled into a measuring and detection light beam path via a polarizing beam splitter 32, which is arranged in the beam path between the collimation lens 11 and the lens array 12. The measuring light 5, polarized for example perpendicular to the drawing plane of FIG. 3, impinges on the polarizing beam splitter 32 from below in the arrangement according to FIG. 3 and is initially reflected by it to the right towards the lens array 12. For polarization of the measuring light 5, a polarizer 33 for the measuring light 5 is arranged in the beam path between the light source 4 and the polarizing beam splitter 32. The polarizer 33 is designed as a linear polarization filter. A 90° deflection mirror 34 is arranged in the beam path between the polarizer 33 and the polarizing beam splitter. A spectral bandpass filter 35 is arranged upstream of the polarizer 33 in the beam path, which limits a spectral range of the measuring light 5 to a spectral range for which the hyperchromatic objective 14 of the measuring apparatus 31 is designed.

An aperture 36 in the beam path between the polarizing beam splitter 32 and the lens array 12 is designed as a field stop for the measuring light 5 and delimits an illuminated region on the input region of the lens array 12. A λ/4 plate 37 is arranged between the polarizing beam splitter 32 and the aperture 36 in the beam path of the measuring light 5. After a double pass of the λ/4-plate 37, the measuring light 5, originally polarized perpendicular to the drawing plane of FIG. 3, is polarized parallel to the drawing plane of FIG. 3 and thus passes through the polarizing beam splitter 32 in FIG. 3 from right to left. The subsequent beam path through the collimation lens 11 then serving as a focusing lens, the pinhole aperture 10, the focusing lens 8 then serving as a collimation lens corresponds to the beam path explained above in connection with the measuring apparatus 1. In the detection beam path of the measuring light 5 following the lens 8, the measuring light first passes through a further aperture 38 which defines a plane 39 to be imaged which is optically conjugate to an arrangement plane 40 of the lens array 12. The lenses 8 and 11 thus image plane 39 onto plane 40, wherein this imaging is telecentric. The imaging between planes 39 and 12 through the lenses 8 and 11 is telecentric.

The detection beam path of the measuring light 5 first passes through another focusing lens 41 after the aperture 38 and then through a non-polarizing beam splitter 42. A measuring light portion 5B reflected by the non-polarizing beam splitter first passes through the linear color filter 25 and then through a collimation lens 43 before the measuring light partial beam 5B impinges on the detector array 26. The measuring light partial beam 5B transmitted by the non-polarizing beam splitter 42 first passes through a collimation lens 44 and then impinges on the detector array 23. The lens pairs 41, 43 on the one hand and 41, 44 on the other hand represent telescopes which provide for a, in particular telecentric, imaging of the entrance plane 39 onto the arrangement planes of the detector arrays 26, 23.

An illumination plane which is spaced apart from the arrangement plane 15 or 40 by the focal length of the array lenses 13 is designated 45 in FIG. 3. This plane 45 is the illumination plane of the lens array 12. This plane 45 is imaged onto the object plane 16 via the chromatic objective 14.

A spatial extension of the light source 4 can be variably adjusted by means of a fiber or aperture not shown in FIG. 3.

The invention claimed is:

1. A confocal measuring apparatus (1; 31) for 3D measurement of an object surface (2),
    having a light source (4) for generating measuring light (5),
    having a lens array (12) having a plurality of array lenses (13),
    having a hyperchromatic telescope (14) imaging an object plane (16) into an arrangement plane (15) of the lens array (12),
    having a multiplexer optics (11) arranged at a distance of a total of a focal length ($f_{AL}$) of the array lenses (13) and a focal length ($f_{MO}$) of the multiplexer optics (11), downstream of the lens array (12) in a beam path of the measuring light (5) which emanates from the object plane (16), and
    having a single pinhole aperture (10), which is arranged at a distance of the focal length ($f_{MO}$) of the multiplexer optics (11), downstream of the multiplexer optics (11) in the beam path of the measuring light (5), which emanates from the object plane (16);
    having a collimation optics (8) which is arranged downstream of the single pinhole aperture (10) in the beam path of the measuring light (5) emanating from the object plane (16);
    having a spatially resolved detection device (24) which is arranged downstream of the collimation optics (8) in the beam path of the measuring light (5) emanating from the object plane (16),
    having a beam splitter (7) arranged between the light source (4) and the single pinhole aperture (10); and
    having a further beam splitter (22) for dividing the measuring light (5) into two measuring light partial beams (5A, 5B),
        a first of the two measuring light partial beams (5A) being directed onto a first detector array (23), and
        a second of the two measuring light partial beams (5B) being directed onto a further detector array (26),
    wherein the multiplexer optics (11) is arranged between the lens array (12) and the single pinhole aperture (10), and
    wherein the single pinhole aperture (10) serves as a multiplexer for spatial filtering of the beam paths of all individual channels of the measuring light beam path assigned to the respective array lenses (13).

2. The confocal measuring apparatus according to claim 1,
    wherein a beam path of the measuring light (5) in the hyperchromatic telescope (14) is telecentric.

3. The confocal measuring apparatus according to claim 1, comprising at least one color gradient filter (25) in one of the two measuring light partial beams (5A, 5B).

4. The confocal measuring apparatus according to claim 1, wherein a raster spacing of the array lenses (13) of the lens array (12) is adapted to a raster spacing of detector pixels of the at least one the first detector array (23) or the further detector array (26).

5. The confocal measuring apparatus according to claim 1, comprising a spectral bandpass filter (35) for limiting a spectral range of the measuring light.

6. The confocal measuring apparatus according to claim 1,
    wherein the collimation optics (8), the single pinhole aperture (10), the multiplexer optics (11), the lens array (12), and the hyperchromatic telescope (14) are arranged one behind another along an axis perpendicular to the object plane (16).

7. The confocal measuring apparatus according to claim 1, further comprising
    a folding mirror (21) arranged between the beam splitter (7) and the further beam splitter (22).

8. The confocal measuring apparatus according to claim 1,
    wherein a raster spacing of the array lenses (13) of the lens array (12) is adapted to a raster spacing of detector pixels of the detector array (23) and the further detector array (26).

9. The confocal measuring apparatus according to claim 1,
    wherein a number of the array lenses (13) is at least 10,000.

10. The confocal measuring apparatus according to claim 1,
    wherein a number of the array lenses (13) is 10,000 to 100,000.

11. The confocal measuring apparatus according to claim 1,
    wherein a number of the array lenses (13) is 10,000 to 1,000,000.

12. The confocal measuring apparatus according to claim 1,
    wherein a number of the array lenses (13) is 100,000 to 1,000,000.

* * * * *